United States Patent
Autret et al.

(10) Patent No.: US 11,988,385 B2
(45) Date of Patent: May 21, 2024

(54) PRODUCTION BY ADDITIVE MANUFACTURING OF COMPLEX PARTS

(71) Applicant: SAFRAN HELICOPTER ENGINES, Bordes (FR)

(72) Inventors: Jean-Paul Didier Autret, Moissy-Cramayel (FR); Thomas Sebastien Alexandre Gresy, Moissy-Cramayel (FR); Stéphane Lavignotte, Moissy-Cramayel (FR); Nicolas Roland Guy Savary, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 18/002,011

(22) PCT Filed: Jun. 9, 2021

(86) PCT No.: PCT/FR2021/051030
§ 371 (c)(1),
(2) Date: Dec. 15, 2022

(87) PCT Pub. No.: WO2021/255364
PCT Pub. Date: Dec. 23, 2021

(65) Prior Publication Data
US 2023/0258337 A1 Aug. 17, 2023

(30) Foreign Application Priority Data
Jun. 15, 2020 (FR) ....................... 2006204

(51) Int. Cl.
*F23R 3/00* (2006.01)
*B33Y 80/00* (2015.01)

(52) U.S. Cl.
CPC .............. *F23R 3/002* (2013.01); *F23R 3/005* (2013.01); *B33Y 80/00* (2014.12); *F23R 2900/00018* (2013.01); *F23R 2900/03042* (2013.01)

(58) Field of Classification Search
CPC .................... F23R 3/002; F23R 2900/03042
See application file for complete search history.

(56) References Cited

U.S. PATENT DOCUMENTS 4,184,326 A * 1/1980 Pane, Jr. .................. F23R 3/08
60/759
4,549,402 A 10/1985 Saintsbury et al.
(Continued)

FOREIGN PATENT DOCUMENTS

DE 10 2017 216 595 A1 3/2019
EP 3 073 196 A1 9/2016
(Continued)

OTHER PUBLICATIONS

Valmik Bhavar, "A Review on Powder Bed Fusion Technology of Metal Additive Manufacturing," https://www.researchgate.net/publication/285982651, uploaded by Valmik Bhavar on Apr. 14, 2016. (Year: 2016).*

(Continued)

*Primary Examiner* — David P. Olynick
(74) *Attorney, Agent, or Firm* — CHRISTENSEN O'CONNOR JOHNSON KINDNESS PLLC

(57) ABSTRACT

A gas turbomachine combustion chamber includes bridges extending side by side to connect in one piece a radially inner wall and a radially outer wall towards a free end of the radially inner wall. The bridges, inner wall, and outer wall have an additive layer structure.

4 Claims, 3 Drawing Sheets

(56) References Cited

U.S. PATENT DOCUMENTS

| | | | | |
|---|---|---|---|---|
| 4,749,029 A * | 6/1988 | Becker | ............... | F23R 3/002 |
| | | | | 165/47 |
| 4,864,827 A * | 9/1989 | Richardson | ............ | F23R 3/002 |
| | | | | 60/755 |
| 5,259,182 A * | 11/1993 | Iwai | ............... | F23R 3/14 |
| | | | | 60/777 |
| 9,217,568 B2 * | 12/2015 | Cunha | ............... | F23R 3/005 |
| 2002/0162331 A1 | 11/2002 | Coutandin | | |
| 2010/0251722 A1 * | 10/2010 | Woolford | ............... | F23R 3/002 |
| | | | | 60/755 |
| 2012/0255311 A1 * | 10/2012 | Miyake | ............... | F28F 3/022 |
| | | | | 29/890.035 |
| 2016/0230566 A1 * | 8/2016 | King | ............... | F23R 3/002 |
| 2017/0363295 A1 | 12/2017 | Stastny et al. | | |
| 2018/0010796 A1 | 1/2018 | Monty et al. | | |

FOREIGN PATENT DOCUMENTS

| | | |
|---|---|---|
| EP | 3 144 485 A1 | 3/2017 |
| FR | 3 041 889 A1 | 4/2017 |
| FR | 3 072 448 A1 | 4/2019 |
| FR | 3 097 028 A1 | 12/2020 |
| WO | 2018/144064 A1 | 8/2018 |

OTHER PUBLICATIONS

International Search Report dated Sep. 14, 2021, issued in corresponding International Application No. PCT/FR2021/051030, filed Jun. 9, 2021, 7 pages.

Written Opinion dated Sep. 14, 2021, issued in corresponding International Application No. PCT/FR2021/051030, filed Jun. 9, 2021, 9 pages.

* cited by examiner

PRODUCTION BY ADDITIVE MANUFACTURING OF COMPLEX PARTS

TECHNICAL FIELD

The invention relates, in the field of aeronautic turbomachines, to the production of fairly complex parts by additive manufacturing.

It thus relates to the production by additive manufacturing of at least one part of a gas turbomachine combustion chamber.

Such production may be performed in particular by additive manufacturing on a powder bed.

PRIOR ART

Additive manufacturing makes it possible to manufacture parts with relatively complex geometries, without the restrictions associated with the use of a mould for example.

However, such manufacturing methods are still limited by the amount of time required for manufacturing, the high manufacturing costs as well as some difficulties that relate to their implementation.

FR3041889 and EP3002212 propose solutions for the production of parts by additive manufacturing, in particular on a powder bed. Details of these production techniques are applicable here.

In this general context, the present subject-matter relates specifically to the production of at least one part of a gas turbomachine combustion chamber by such a method.

In order to protect a wall from the effects of heat, it is known that establishing a film of air is effective in such a combustion chamber. This film can be obtained by a double wall of short length supplied with air passages (often referred to as holes) which traverse one of the walls. The double wall directs air along the surface to be protected in a more homogenous manner. An existing solution for forming such zones of the combustion chamber consists of independently making a piece of sheet metal which will define the inner lining wall from the outer wall of the actual body of the combustion chamber, then assembling, by welding or soldering this piece of sheet metal to said body while maintaining a gap to ensure the air film. This forces to boiler work the parts to be assembled so as to position them correctly.

After assembly, a calibration operation is necessary so that the spacing between the walls is suitable for ensuring a homogenous flow of the air film.

These operations directly impact the cost and the production cycle.

The aim of the invention is to solve at least some of the aforementioned problems.

SUMMARY OF THE INVENTION

In order to improve the situation, the present document proposes a method for producing by additive manufacturing at least one part of a combustion chamber of an aeronautical turbomachine extending about an axis (referred to as X1 in the following) and comprising a radially outer wall lined locally by a radially inner wall so as to form between them an intermediate space for creating an air film, this method being characterised in particular in that from the bottom up and by additive manufacturing successions:

while, by depositing a succession of layers of material, a lower portion of said radially outer wall is erected, the deposition of layers of said material is continued in order to erect, on said lower portion, bridges which are built up next to one another up to the tops of said bridges where the deposition of layers of said material is continued to create the radially inner wall, while continuing with erecting the radially outer wall, and said deposition of layers of material is continued, at least until said lower part of the radially outer wall joins a radially inner wall end located at the opposite of the bridges.

Thus, at the upstream end, the radially inner wall will join the radially outer wall.

Such an upstream connection end, which can be around the base of the combustion chamber, is important.

Indeed, it will be possible in this way to produce the radially inner wall in the same part as the radially outer wall, whereas the direction of manufacture does not allow the manufacture of a suspended wall.

The manufacture of these supports or props which form the succession of bridges becomes easy.

"Radially" means radial with respect to the axis X1. The radially outer wall is, in this direction, further away from the axis X1 than the radially inner wall.

If, as further proposed, the said additive manufacturing is carried out on a metallic powder bed, by means of a laser, the bridges arranged in this way make it possible to dissipate the energy of the laser and obtain solidification of the metal necessary for the erection of the radially inner wall.

This effect of energy dissipation, then good air flow in the space between said radially outer wall and radially inner wall respectively, may be even better if, as also proposed, the radially outer wall and the radially inner wall are parallel to each other over part of the length of the radially inner wall extending between its connecting ends to the radially outer wall and to the bridges respectively.

This does not prevent them from being connected (jointed) to one another on the upstream side of the combustion chamber, the two walls being inclined with respect to the axis X1, and thus moving closer to this axis X1 towards upstream, with a steeper slope for the radially outer wall towards the upstream end (in FIG. 2 below, the face 30b can be almost perpendicular to the axis X1).

This steeper slope of the radially outer wall (which may therefore be at the location of the face 30b in the following), may belong to a base of the combustion chamber located along the axis X1, at the upstream end of the combustion chamber, axially opposite the opening, centred on the axis X1, that the combustion chamber has about the axis X1, at the downstream end, for the discharge of hot gases from combustion in the combustion chamber.

For the entry of combustion air and/or fuel (a priori fuel oil) into the combustion chamber, the aforementioned base may be annular, with a central passage centred on the axis X1.

Perpendicular to the axis X1, the section of this central passage is smaller than the section of the opening for the discharge of hot gases.

Additive manufacturing also makes it possible that by continuing with the deposition of layers of said material after the manufacture of a lower combustion chamber zone, as explained above, there is the continuous creation annularly around said axis (X1) of:

the radially outer wall,
the radially inner wall, and
the bridges arranged next to one another towards the end of the radially inner wall opposite the one where the radially inner wall joins the radially outer wall, this:

by manufacturing about the axis (X1), said radially outer and radially inner polygonal walls respectively (of other parts of these walls) and by inclining the bridges so that they extend between said radially outer and radially inner walls respectively, transversely to the side of the polygon where these bridges are located.

Thus, by inclining the bridges considered they will be able to extend between said radial outer and radially outer walls respectively, at least for some, in a not necessarily perpendicular way, but rather in an inclined manner (slanted) with respect to the side concerned. Angles other that 90° are possible, such as between 10° and 80°.

In order to supply air to the space created between the radially outer wall and radially inner wall, it is useful to have openings in the radially outer wall which can open into this space.

The orientation of at least some of these openings will be altogether parallel to said axis (X1) for an efficient air sweep.

In addition, the method of the invention also relates to a combustion chamber of a gas turbomachine comprising about said axis (X1) radially outer and radially inner wall s respectively, with local lining, so as to form between them said intermediate space capable of creating an air film.

More precisely, it relates to a combustion chamber of a gas turbomachine having an axis (X1) along which the combustion chamber has an upstream side and a downstream side, the combustion chamber comprising, about said axis (X1), a radially outer wall lined locally by a radially inner wall, the two walls being spaced apart from each other so as to form between them an intermediate space capable of creating an air film with the further features:

that individual bridges extending next to one another, connect(joint) the radially inner wall and the radially outer wall in one piece to a free end of the radially inner wall and that the two walls, radially outer wall and radially inner wall respectively:

are connected(jointed) to each other on the upstream side (thus towards an end opposite said free end), and are therefore inclined with respect to the axis (X1) considered in a direction oriented upstream, towards the axis (X1), with a slope of the radially outer wall which is steeper towards said upstream jointing side end than it is downstream.

Thus, with respect to the axis (X1), the radially outer wall favourably has a steeper slope towards its upstream connection end than further downstream towards said free end.

Of course, it is understood that the above "upstream connecting end" is the (upstream) end of the radially outer wall where the latter connects—joins—the upstream connecting end to that of the radially inner wall.

Further downstream from their respective "upstream connecting ends", the radially inner and radially outer walls may usefully become substantially parallel, thus avoiding at the free end of the radially inner wall a so-called intermediate space and thus an unsuitable air film as they occupy too small a space.

Among the features of this combustion chamber, it should be noted that individual bridges extending side by side connect the radially inner wall and the radially outer wall to a free end of the radially inner wall:

in one piece and/or such that the bridges and, at least locally, the radially inner wall and the radially outer wall are obtained by stacking successive layers;

the technique often referred to as "additive layer structure".

As mentioned above, this should improve the situation with regard to at least some of the aforementioned disadvantages.

The expression "with an additive layer structure" has the meaning of being in one piece, but also: "produced by additive manufacturing", with a physicochemical structure specific to this manufacturing and which can be recognised by a physicochemical analysis of this structure and thus differentiated from a manufacturing process of casting or injection.

In order to favour a continuous periphery (about the axis X1) for supporting the film wall and a homogenous passage of air, it is furthermore proposed that on this combustion chamber, at one end where they connect to the radially inner wall, the bridges flare out:

until they come into contact in pairs and/or to an angle of less than 150° or between 120° and 160°.

Again, in order to favour a homogenous passage of air it is also proposed:

that around the axis (X1), the said radially outer wall and radially inner wall respectively have polygonal faces, and that, perpendicular to the direction in which they connect the said radially inner wall and radially outer wall, and perpendicular to the direction in which the radially inner wall and radially outer wall extend about said axis (X1), the bridges are elongated and each have double-bevelled ends.

With regard to the openings for air in the radially outer wall, which open between said radially outer wall and radially inner wall, it is even proposed:

that they be formed on several faces of the radially outer wall, along several parallel lines, and/or that they have individually a convex pentagon shape.

Finally, the invention also relates to an aeronautical turbomachine comprising the combustion chamber provided with all or some of the above features.

With regard to additive manufacturing, this technique includes methods of manufacturing parts in volume, by adding or agglomerating material, by piling up successive layers. By using computer-aided design, a specific software organises cutting into slices the various layers necessary to make the part. The use of several materials can make it possible to obtain a part with a thermal expansion that is zero and/or is controlled or other physical properties. A step of hot isostatic pressing, cold isostatic pressing or vacuum densification sostatic pressing can be provided to obtain parts which do not have in particular undesired anisotropy or porosity. The part can comprise a metallic alloy and/or a ceramic material.

DESCRIPTION OF THE EMBODIMENTS

Figure 1:
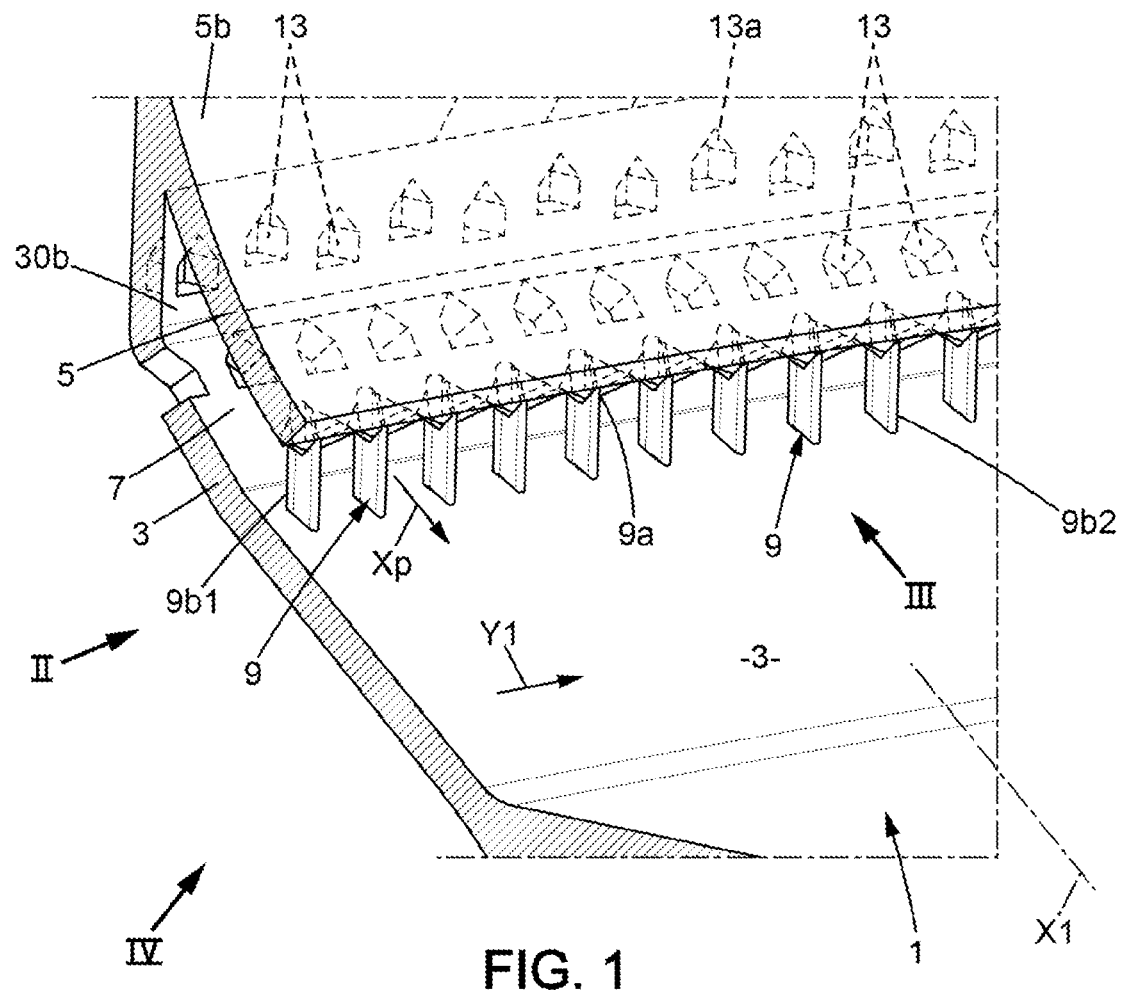
FIG. 1 outlines a possible embodiment of a solution according to the invention, illustrating an upstream lower part of an aeronautical turbomachine combustion chamber, in perspective and axial section (axis X1).

In the following description, identical reference numerals denote identical parts or parts having similar functions.

A subject-matter of the invention is therefore, marked 1 in the figures (FIG. 5 in particular), a combustion chamber of an aeronautical turbomachine (gas).

As is known, such a combustion chamber 1 is interposed between, upstream with respect to the general direction of gas flow in the turbomachine, a compressor and, downstream, a turbine.

Upstream, an air and fuel injection system supplies the combustion chamber with air and fuel. A fraction of the upstream air from the compressor is guided through the injection system for forming a fuel mixture injected along an axis X1. The mixture passes through a primary zone inside the combustion chamber where the combustion reactions take place, then the gases produced are diluted and cooled in a secondary zone, further downstream, and are distributed to the turbine which they drive.

X1 is also the axis about which the combustion chamber 1 extends from upstream to downstream.

Figure 5:
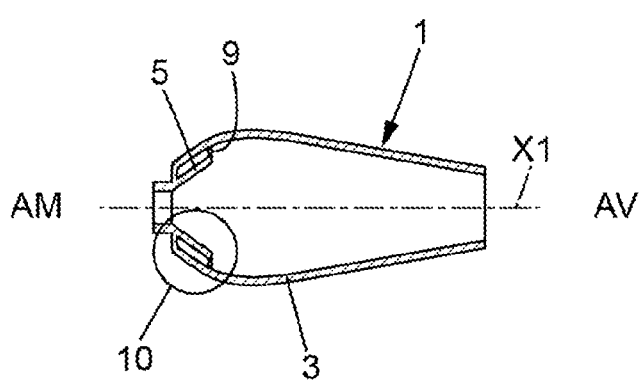
FIG. 5 is a rough axial cross-section of the above combustion chamber.

The combustion chamber 1 thus has consequently, along axis X1, at the upstream end, a base traversed by a central passage central and at the downstream end, a hot gas discharge opening; see FIG. 5.

As can also be seen in FIG. 5, perpendicular to the axis X1, the section of the central passage is preferably smaller than the section of the hot gas discharge opening.

The gas turbomachine equipped with the combustion chamber 1 can be a double flux and double body turbojet engine, provided from upstream (AM) to downstream (AV) with a fan, a low-pressure compressor, a high-pressure compressor, and annular combustion chamber, a high-pressure turbine and a low-pressure turbine.

As illustrated in particular in FIG. 1, the combustion chamber 1 comprises, about the axis X1, a radially outer wall 3 locally lined by a radially inner wall 5.

Thus, there is an intermediate space 7 between the radially outer wall 3 and radially inner wall 5. An air film can be created between the walls.

In order to manufacture the radially inner wall 5 in the same part as the radially outer wall 3, bypassing the problem of forming a suspended wall, individual bridges 9, extending next to one another, connect the radially inner wall 5 and the radially outer wall 3 in one piece towards a free end 5a of the radially inner wall 5.

In other words, the bridges 9 and, at least locally, as in the lower zone 10 of the combustion chamber 1 (FIG. 5), the radially inner wall 5 and the radially outer wall 3 are made in one piece and have a common structure of additive layers.

In order to favour the continuity of the periphery (about the axis X1) for supporting (support for said lower zone 10) the radially inner wall 5 and a homogenous passage of air in the intermediate space 7, the presence of bridges 9 that flare out at one end (or top) 9a where they connect to the radially inner wall 5 may be useful.

Figure 3:
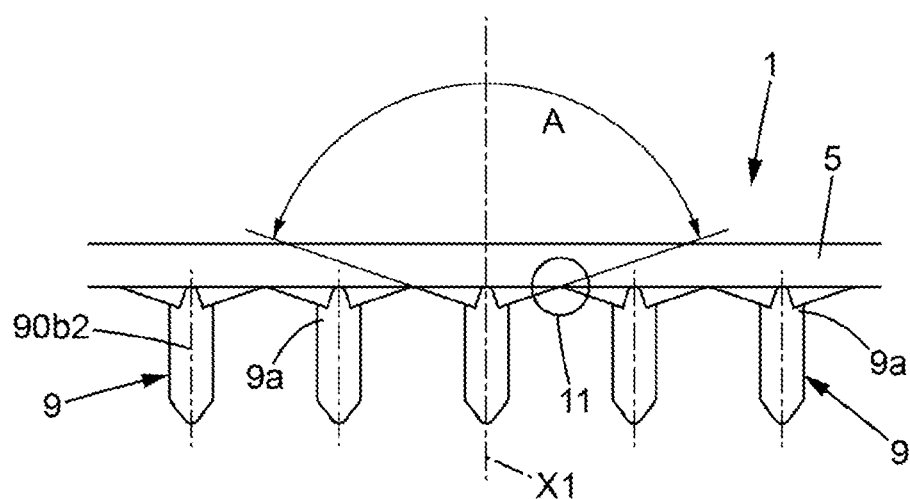
FIG. 3 outlines the section of FIG. 1 as seen following the arrow III.

In particular, the bridges 9 may flare out:
  until they come into contact in pairs (zone 11, FIG. 3), and/or
  to an angle A of less than 150° or between 120° and 160°. This is a compromise between the additive manufacturing capacity and the mechanical effect to be achieved.

Figure 4:
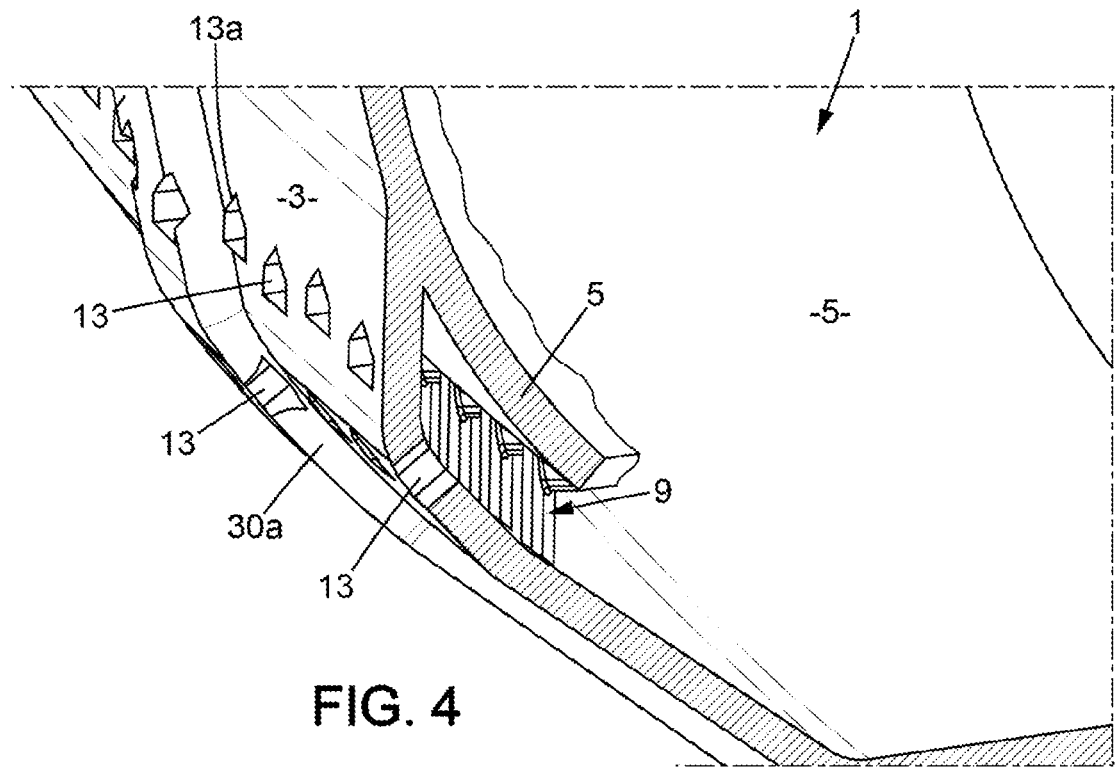
FIG. 4 represents the view of FIG. 1 seen following the arrow IV.

To further promote a homogenous air flow (fairly stable), it is advisable:
  that about the axis X1, said radially outer wall 3 and radially inner wall 5 have polygonal faces (see FIG. 4), and
  that, perpendicular to the direction in which the bridges 9 connect said inner wall 5 and outer wall 3, and perpendicular to the direction (Y1) in which these walls 3 and 5 extend about said axis X1, the bridges 9 are elongated (direction Xp FIG. 1) and have double bevelled ends 9b1, 9b2.

The tapered ends 9b1, 9b2 are aerodynamic and bridges 9 that are longer (direction Xp) than they are wide stabilise the airflow from upstream to downstream.

Providing openings 13 in the radially outer wall 3 into the intermediate space 7 will ensure a circulation which is conducive to the creation of the desired air film along the inner side of the radially outer wall 3.

With regard to these openings 13, it is even proposed:
  that they are formed on multiple faces, such as 30a, 30b, of the radially outer wall 3, preferably along several lines parallel to one another, and/or
  that they have individually a convex pentagonal form (see FIG. 1).

The convex part 13a, with a double slope, of each convex pentagon is preferably located closer to the axis X1 than the other sides of the pentagon.

Thus, it is useful to associate a polygonal face design of the walls 3, 5 adapted to additive manufacturing and a distribution of the openings 13 distributed about the axis X1 with an optimised mechanical strength (convex pentagon shape).

Figure 2:
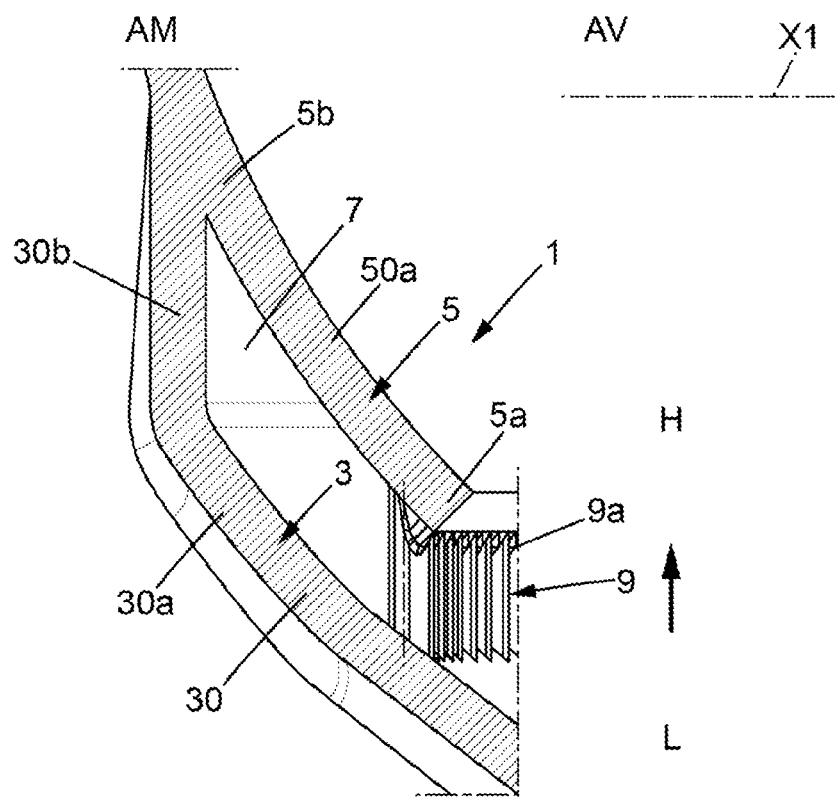
FIG. 2 outlines the section of FIG. 1 as seen following the arrow IIe.

With regard to the production of at least one part of the combustion chamber, such as part 1, it should be noted that it is of particular interest that due to additive manufacturing, this is done from the bottom to the top (respectively L and H, and arrow, FIG. 2).

Thus, while a lower part 30 (lower zone 10) of said radially outer wall 3 is created by depositing a succession of layers of material, the deposition of such layers of material is continued in order to build up on said lower part bridges 9 which are then set up next to one another up to the tops 9a of these bridges.

At this point, the deposition of layers of material can be continued to create (initiate the creation of) the radially inner wall 5, while continuing with the creation of the radially outer wall 3.

As it goes along, said layers of material are deposited continuously, at least until the said lower part 30 of the radially outer wall 3 and an end 5b of the radially inner wall 5 opposite to that of 5a meet (parallel to the axis X1) where the bridges 9 are located.

Thus, in the lower zone 10, the radially inner wall 5 is inclined with respect to the axis X1 and rises towards its end 5b connecting to the radially outer wall 3.

The radially outer wall 3 is also inclined with respect to the axis X1.

Preferably, for a compromise between manufacturing, mechanical strength and aerodynamic effort, it is advisable in this respect that the radially outer wall 3 and the radially inner wall 5 are parallel to one another, over most of the length L of the radially inner wall 5 extending between said ends 5a and 5b.

Over the rest of the outline (closed, therefore perimeter) of the radially outer wall 3 and the radially inner wall 5, if the aforementioned manufacturing technique is also used, it is advisable to proceed in the same way: incline the two walls 3 and 5 with respect to the axis X1, but with inverse directions of progression in the upper part of said walls 3, 5, and therefore of the combustion chamber 1, namely by raising the radially inner wall 5 from its end 5b connecting to the radially outer wall 3 towards its free end 5a, where the brides 9 will be raised until they are connected to the radially outer wall 3 that the layer deposition in progress will have continued to create in the meantime.

In this respect, it should be noted that in the interests of compromise (between manufacturing, mechanical strength and aerodynamic impact) that while continuing with depositing layers of said material, the radially outer wall 3, the radially inner wall 5 and the bridges 9 are created continually about axis X1, which are then arranged next to one another, towards the free end 5a of the radially inner wall 5, this:

by forming, about the axis X1, said polygonal radially outer wall 3 and radially inner wall 5, and by inclining the bridges 9 so that the bridges extend between said radially outer wall 3 and radially inner wall 5, transversely to the side (or face) of the polygon where they are arranged: see for example FIG. 2: bridges 9 able to be set vertically between the face 30a of the radially outer wall 3 and the substantially parallel face 50a of the radially inner wall 5, these two faces being inclined relative to the axis X1, approaching this axis X1 in upstream direction.

Here the term transversely does not necessarily mean perpendicular, but rather inclined relative to the side concerned.

The invention claimed is:

1. A method of production by additive manufacturing of at least one part of an aeronautic turbomachine combustion chamber extending about an axis and comprising a radially outer wall which is lined locally by a radially inner wall so as to form therebetween an intermediate space that creates a film of air, wherein from bottom to top, and by additive manufacturing:

while, by depositing a succession of layers of material, a lower portion of said radially outer wall is created, the deposition of layers of said material is continued in order to erect, on said lower portion, bridges which are built up next to one another up to tops of said bridges, wherein:

the deposition of layers of said material is continued to create the radially inner wall, while continuing with erecting the radially outer wall, wherein the deposition of layers joins the radially inner wall and radially outer wall to the bridges; and said deposition of layers of material is continued, at least until said lower portion of the radially outer wall and an end of the radially inner wall opposite to a location where the bridges join together, and:

by manufacturing, according to a polygonal design, around the axis, said radially external wall and radially internal wall, and by manufacturing the bridges so that, between said radially outer wall and radially inner wall, the bridges extend in an inclined manner, not perpendicular to a side of a polygon where they are arranged, so that the bridges are disposed adjacent to each other towards the end of the radially inner wall opposite to that where the radially inner wall joins the radially outer wall and wherein the radially inner wall is located in an upstream portion of the combustion chamber adjacent to an air fuel injection system for the combustion chamber.

2. The method according to claim 1, wherein said additive manufacturing is performed on a metallic powder bed.

3. The method according to claim 1, wherein the radially outer wall and the radially inner wall are parallel to one another over a portion of a length of the radially inner wall extending between its ends.

4. The method according to claim 1, wherein, in the radially outer wall, openings are made which open between the radially outer wall and the radially inner wall.

\* \* \* \* \*